(12) United States Patent
Royer, Jr. et al.

(10) Patent No.: US 8,935,458 B2
(45) Date of Patent: Jan. 13, 2015

(54) DRIVE ASSISTED SYSTEM CHECKPOINTING VIA SYSTEM RESTORE POINTS

(75) Inventors: Robert J. Royer, Jr., Portland, OR (US); Amber D. Huffman, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 12/984,723

(22) Filed: Jan. 5, 2011

(65) Prior Publication Data
US 2012/0173794 A1    Jul. 5, 2012

(51) Int. Cl.
*G06F 12/00* (2006.01)
*G06F 11/14* (2006.01)

(52) U.S. Cl.
CPC ........ *G06F 11/1456* (2013.01); *G06F 11/1469* (2013.01); *G06F 11/1451* (2013.01)
USPC .... 711/103; 711/102; 711/166; 711/E12.001; 711/E12.008

(58) Field of Classification Search
CPC combination set(s) only.
See application file for complete search history.

(56) References Cited

U.S. PATENT DOCUMENTS

| | | | |
|---|---|---|---|
| 5,555,402 A * | 9/1996 | Tuma et al. | 703/24 |
| 8,112,489 B1 * | 2/2012 | Cox et al. | 709/208 |
| 8,176,367 B2 * | 5/2012 | Dreifus et al. | 714/47.3 |
| 8,234,380 B1 * | 7/2012 | Tetreault et al. | 709/226 |
| 8,285,955 B2 * | 10/2012 | Frame et al. | 711/162 |
| 2005/0185496 A1 * | 8/2005 | Kaler | 365/230.06 |
| 2009/0158295 A1 | 6/2009 | Burg et al. | |
| 2009/0172466 A1 | 7/2009 | Royer et al. | |
| 2009/0217111 A1 * | 8/2009 | Ito | 714/718 |
| 2010/0115061 A1 * | 5/2010 | Tai et al. | 709/219 |
| 2010/0125841 A1 | 5/2010 | Bauer et al. | |
| 2010/0169710 A1 | 7/2010 | Royer, Jr. et al. | |
| 2010/0257519 A1 | 10/2010 | Chang | |
| 2010/0306577 A1 * | 12/2010 | Dreifus et al. | 714/6 |
| 2011/0093674 A1 * | 4/2011 | Frame et al. | 711/162 |
| 2012/0042211 A1 * | 2/2012 | Brown et al. | 714/42 |

FOREIGN PATENT DOCUMENTS

WO    2012094147 A3    7/2012

OTHER PUBLICATIONS

International Search Report and Written Opinion for PCT Application No. PCT/US2011/066243. Mailed on Jul. 24, 2012, 9 pages.

* cited by examiner

*Primary Examiner* — Mardochee Chery
(74) *Attorney, Agent, or Firm* — Jordan IP Law, LLC

(57) ABSTRACT

Systems and methods of managing computing system restore points may include an apparatus having logic to receive a command to start a restore point for a solid state drive (SSD). The logic may also conduct a context drop of an indirection table from a volatile memory of the SSD to a non-volatile memory of the SSD in response to the command to start the restore point.

18 Claims, 4 Drawing Sheets

DRIVE ASSISTED SYSTEM CHECKPOINTING VIA SYSTEM RESTORE POINTS

BACKGROUND

1. Technical Field

Embodiments generally relate to the creation and management of system restore points. More particularly, embodiments relate to the use of solid state drive (SSD) checkpointing to create and manage system restore points.

2. Discussion

Computing systems typically store data to different types of storage media and devices, wherein when system upgrades and/or patches are conducted, conventional software may manually create restore points by copying/renaming the files to be affected to a secure location before the upgrade/patch installation is conducted. If the installation is unsuccessful, the files may be retrieved from the secure location, effectively restoring the system to the pre-installation state. In the case of iCafe (Internet Café) shops, similar restoration techniques may be used in which custom automation scripts image the drive and restore the system back to a known starting point (e.g., erasing the user's browsing history and any other information saved during the session). While the above approaches may be suitable under certain circumstances, there remains considerable room for improvement. For example, predicting the files to be affected during an installation can be difficult and/or unreliable. Moreover, imaging an entire drive can be time consuming and inefficient.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a system having a processor and a solid state drive with volatile memory, non-volatile memory, and logic to receive a first command to start a restore point for the solid state drive. The logic can also create a restore point in the non-volatile memory in response to the first command. The system may also include a computer readable storage medium including a set of instructions which, if executed by the processor, cause the system to issue the first command to the solid state drive.

Embodiments can also include an apparatus having logic to receive a command to start a restore point for a solid state drive. The logic may provide for creating a restore point in a non-volatile memory of the solid state drive in response to the command to start the restore point.

Other embodiments may include a computer readable storage medium having a set of instructions which, if executed by a processor, cause a computer to issue a first command to a solid state drive, wherein the first command is to instruct the solid state drive to start a restore point. The instructions can also cause a computer to detect an event and issue a second command to the solid state drive in response to the event. The second command may instruct the solid state drive to end the restore point.

Figure 1:
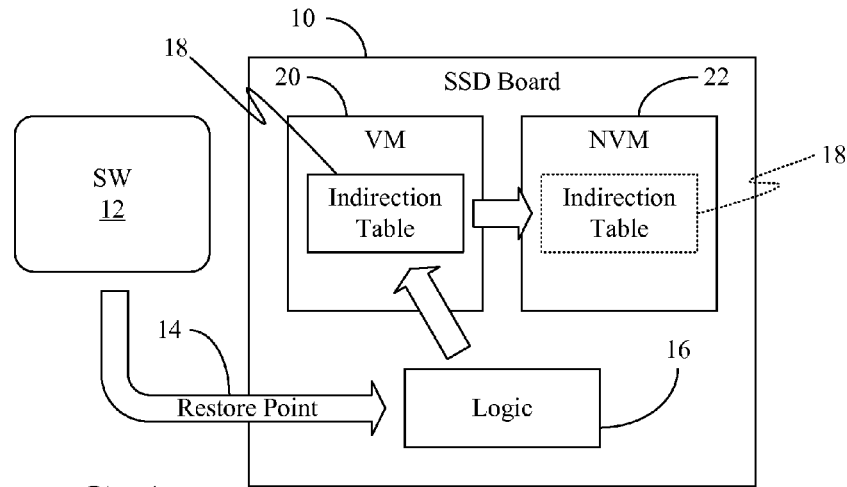
FIG. 1 is a block diagram of an example of a scheme of starting a restore point according to an embodiment.

Turning now to FIG. 1, a scheme of starting a restore point in a solid state drive (SSD) board 10 is shown. The restore point could be associated with, for example, a planned software upgrade and/or patch installation for a computing system containing the SSD board 10 in order to ensure recovery of data stored on the SSD board 10 if the installation is unsuccessful (e.g., due to a power loss, file corruption, etc.). The restore point might also be associated with an "iCafe" session in which the system state automatically reverts to an earlier state upon a user log out of the system at the end of the session.

In the illustrated example, software (SW) 12 executing on a host device (not shown) issues a command 14 to the SSD board 10, wherein the command 14 instructs the SSD board 10 to start the restore point. The SSD board 10 can include logic 16 to receive the command 14 and conduct a context drop of an indirection table 18 from a volatile memory (VM) 20 of the SSD board 10 to a non-volatile memory (NVM) 22 of the SSD board 10 in response to the command 14. In particular, the indirection table 18 may contain logical-to-physical (L2P) address mappings for data stored on the SSD board 10. The indirection table 18 may map user logical address blocks (LBAs) to physical NAND addresses, wherein the software 12 references LBAs when writing data to and reading data from the SSD board 10, and the logic 16 converts the LBAs to physical addresses based on the indirection table 18. Conducting the context drop (e.g., "checkpointing") in response to the command 14 can therefore enable the logic 16 to create a system restore point that indicates where data physically resided on the SSD board 10 at the moment the command 14 was processed. As will be discussed in greater detail, as data is subsequently written to the SSD board 10, invalidation of the previous physical location of the data can be deferred until the restore point is ended and changes are accepted. Otherwise, the SSD board 10 may be reverted to the state reflected in the indirection table 18 involved in the context drop.

Although the illustrated logic 16 is integrated into the SSD board 10, the logic 16 may reside elsewhere in the computing system. For example, a separate controller could be configured to include the logic 16, particularly in an architecture in which a plurality of chips are used collectively as an SSD.

Figure 2A:
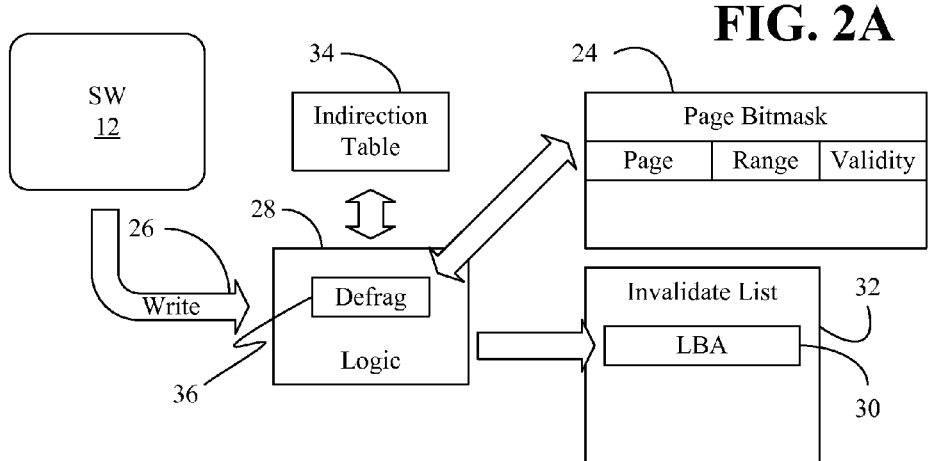
FIGS. 2A and 2B are block diagrams of examples of schemes of tracking write operations during a restore point according to embodiments.

FIG. 2A shows an example of a scheme for tracking write operations after a restore point has been created in an architecture in which a page bitmask 24 is used to track the validity of data on a per page basis. In particular, if logic 28 associated with an SSD detects a write operation 26, the illustrated logic 28 identifies a logical address corresponding to the write operation 26, stores the logical address as an entry 30 to an invalidate list 32, and updates an active indirection table 34 based on the write operation 26 (e.g., maps the logical address to a new physical address in the indirection table currently in VM). As will be discussed in greater detail, the invalidate list 32 can be used to ensure that previous physical addresses corresponding to written to logical addresses are invalidated only if a command to end the restore point and accept changes is received. In particular, the illustrated page bitmask 24 is not modified until/unless such a command is received. The logic 28 may also include a defragmentation ("defrag") module 36 that periodically collects invalid physical locations identified in the page bitmask 24 and returns them to the "erased" state so that they can be used for subsequent write operations.

Figure 2B:
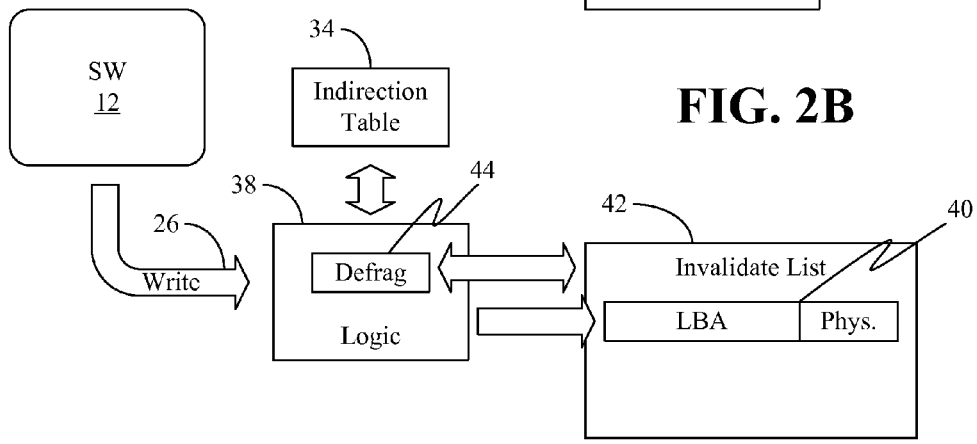

FIG. 2B shows an example of a scheme for tracking write operations after a restore point has been created in an architecture in which a page bitmask is not used to track the validity of data. In particular, if logic 38 detects a write operation 26, the illustrated logic 38 identifies a logical address corresponding to the write operation 26 and uses the logical address to look up a previous physical address corresponding to the logical address in the active indirection table 34. The logic 38 may then store the logical address and the previous physical address as an entry 40 to an invalidate list 42, and update the active indirection table 34 based on the write operation 26 (e.g., map the logical address to a new physical address in the indirection table currently in VM). Because a page bitmask is not used to track the validity of data, the illustrated logic 38 includes a defrag module 44 that uses the invalidate list 42 to conduct defragmentation operations on the SSD. In particular, the defrag module 44 can scan through the invalidate list 42 (e.g., using standard cache hit detection techniques) to determine if physical pages not currently mapped in the indirection table 34 can be safely erased or are part of a restore point and should be preserved.

Figure 3:
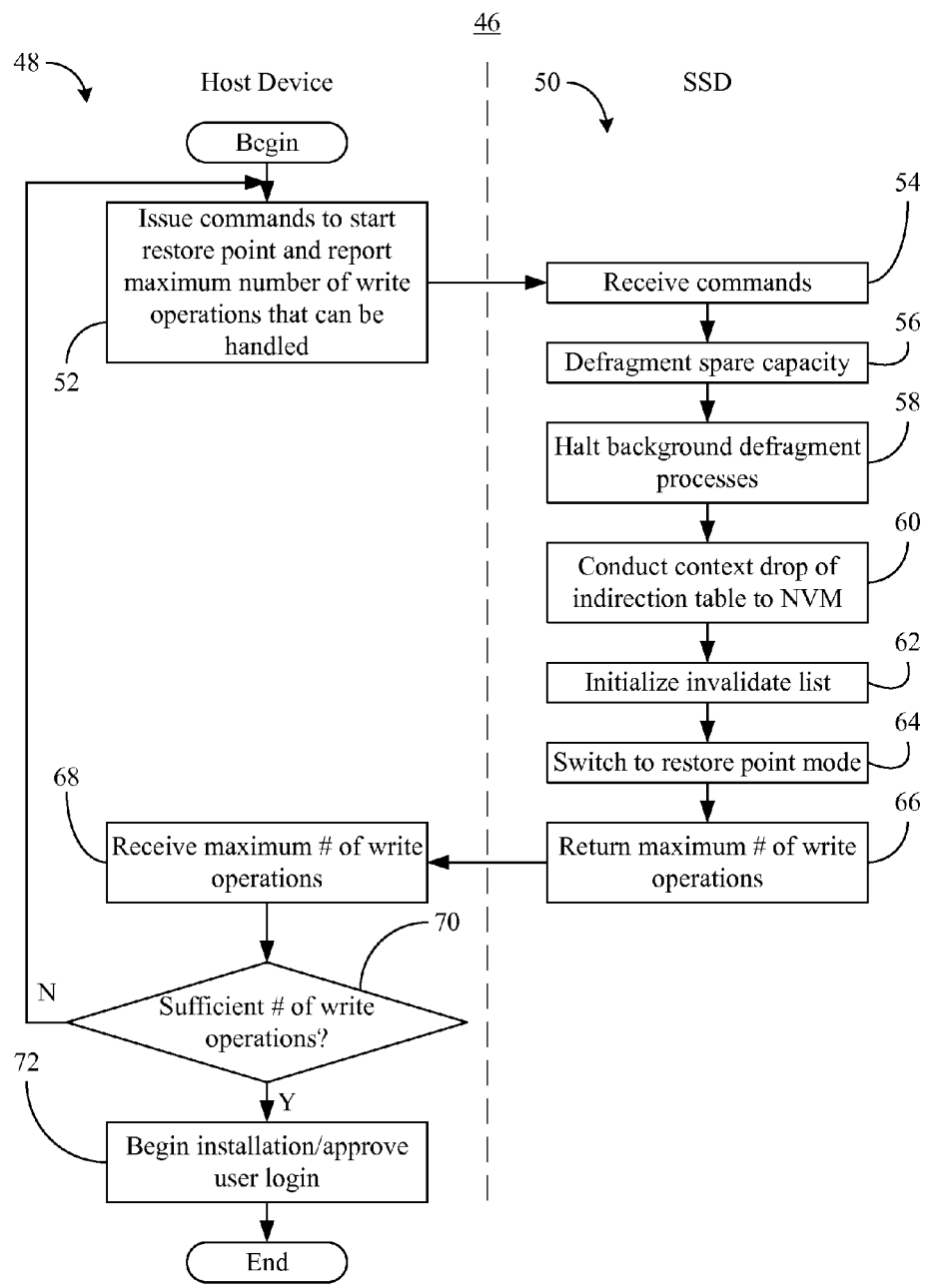
FIG. 3 is a flowchart of an example of a method of starting a restore point according to an embodiment.

Turning now to FIG. 3, a method 46 of starting a restore point in a computing system is shown. In the illustrated example, a portion 48 of method 46 is implemented in a host device (e.g., processor, chipset) of the computing system, and a portion 50 of the method 46 is implemented in an SSD of the computing system. Thus, the SSD portion 50 might be embodied in lower-level firmware logic such as, for example, assembly language programming or machine code, in fixed-functionality logic hardware using circuit technology such as, for example, application specific integrated circuit (ASIC), complementary metal oxide semiconductor (CMOS) or transistor-transistor logic (TTL) technology, or any combination thereof.

The host device portion 48, on the other hand, could be implemented in executable software of the computing system as a set of logic instructions (e.g., operating system/OS call, kernel device driver, application program interface/API, user interface/UI instructions) stored in a machine or computer readable storage medium of a memory such as random access memory (RAM), read only memory (ROM), programmable ROM (PROM), flash memory, etc. For example, computer program code to carry out operations shown in the host device portion 48 may be written in any combination of one or more programming languages, including an object oriented programming language such as Java, Smalltalk, C++ or the like and conventional procedural programming languages, such as the "C" programming language or similar programming languages.

Processing block 52 provides for issuing commands to start a restore point and report the maximum number of write operations that can be handled during the restore point. As will be discussed in greater detail, the maximum number of write operations may be dependent on the amount of spare capacity available on the SSD. Illustrated block 54 receives the commands, wherein the SSD is defragmented (e.g., reclaimed and pre-erased) at block 56 to maximize the spare capacity. In one example, block 56 defrags as much spare capacity as possible within a certain time frame such as, for example, an ATA (Advanced Technology Attachment, e.g., Serial ATA Rev. 3.0 Specification, May 27, 2009, SATA International Organization/SATA-IO) timeout time frame.

Background defrag processes may be halted at block 58, and a context drop of the indirection from VM to NVM may be conducted at block 60, wherein the context drop can be marked as the start of a system restore point. Illustrated block 62 initializes an invalidate list such as, for example, invalidate list 32 (FIG. 2A) or invalidate list 42 (FIG. 2B), already discussed. Thus, the initialized invalidate list may be used to invalidate physical addresses once the host device accepts a firmware update. Block 64 provides for switching the SSD into to a restore point mode, and block 66 provides for returning a value indicating the maximum number of write operations based on the spare capacity freed up in block 56.

Upon receipt of the value indicating the maximum number of write operations at block 68, the host device may conduct a determination at block 70 as to whether the value is sufficient. Looping on block 70 may allow the host to free up as much space as possible without encountering command timeout issues. For example, a particular software upgrade or a purchased iCafe session might be expected to involve a relatively high number of write operations. If it is determined, via user input or other predetermined system requirements, that the maximum number of write operations is insufficient, the previous blocks may be repeated to defrag more spare capacity. If, on the other hand, the maximum number of write operations is sufficient, illustrated block 72 either begins the upgrade/patch installation or approves an iCafe session user login.

Figure 4:
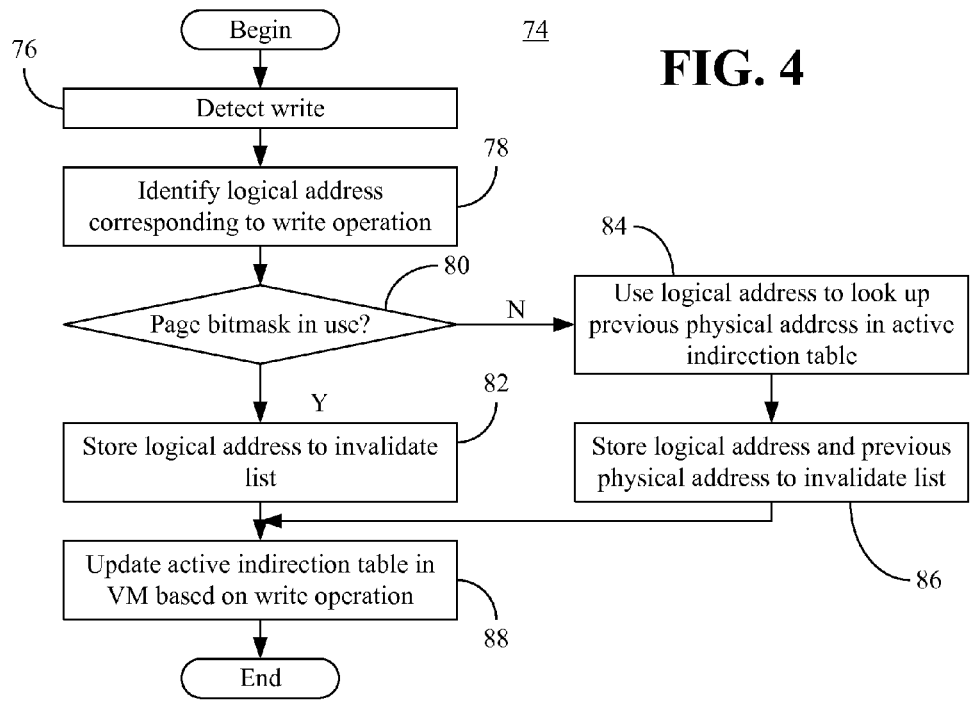
FIG. 4 is a flowchart of an example of a method of tracking write operations during a restore point according to an embodiment.

FIG. 4 shows a method 74 of tracking write operations during a system restore point. The method 74 may be implemented in SSD logic such as, for example, logic 28 (FIG. 2A) or logic 38 (FIG. 2B), already discussed. Illustrated block 76 detects a write operation ("write") and block 78 provides for identifying a logical address corresponding to the write operation. In particular, the write operation may specify a logical address as well as data to be written to that address. If it is determined at block 80 that a page bitmask such as, for example, page bitmask 24 (FIG. 2A) is in use, the logical address specified in the write operation can be stored at block 82 as an entry to an invalidate list such as, for example, invalidate list 32 (FIG. 2A). In particular, the validity status of any page previously containing the data specified in the write operation can be maintained unchanged until/unless a command to end the restore point and accept changes is received.

If a page bitmask is not in use, on the other hand, block 84 may provide for using the logical address to look up the previous physical address of the data being written in the active indirection table. The logical address and the previous physical address can be stored at block 86 as an entry to an invalidate list such as, for example, invalidate list 42 (FIG. 2B), wherein a defrag module may use the invalidate list to conduct defragmentation operations on the SSD, as already discussed. Illustrated block 88 updates the active indirection table in VM based on the write operation.

Figure 5A:
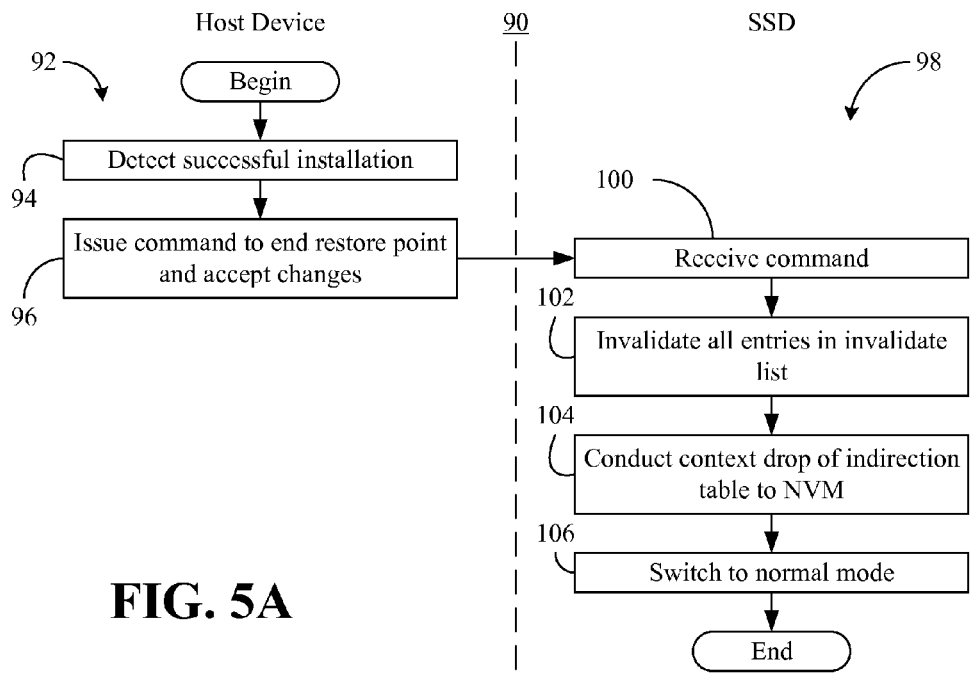
FIGS. 5A and 5B are flowcharts of examples of methods of ending a restore point according to embodiments.

Turning now to FIG. 5A, a method 90 of ending a restore point and accepting changes is shown. In the illustrated example, a host device portion 92 of the method 90 involves detecting a successful installation of a software upgrade and/or patch at block 94 and issuing a command to end a restore point and accept changes in response to the successful installation at block 96. An SSD portion 98 of the method 90 may receive the command at block 100 and invalidate the entries in an invalidate list such as, for example, invalidate list 32 (FIG. 2A) or invalidate list 42 (FIG. 2B), at block 102. As already noted, the invalidation process of block 102 could involve applying the invalidate list to a page bitmask 24 (FIG. 2A), applying the invalidate list to a defrag module 44 (FIG. 2B) process, or other appropriate technique. Illustrated block 104 conducts a context drop of an active indirection table to NVM, wherein the SSD may be switched back to normal mode at block 106.

Figure 5B:
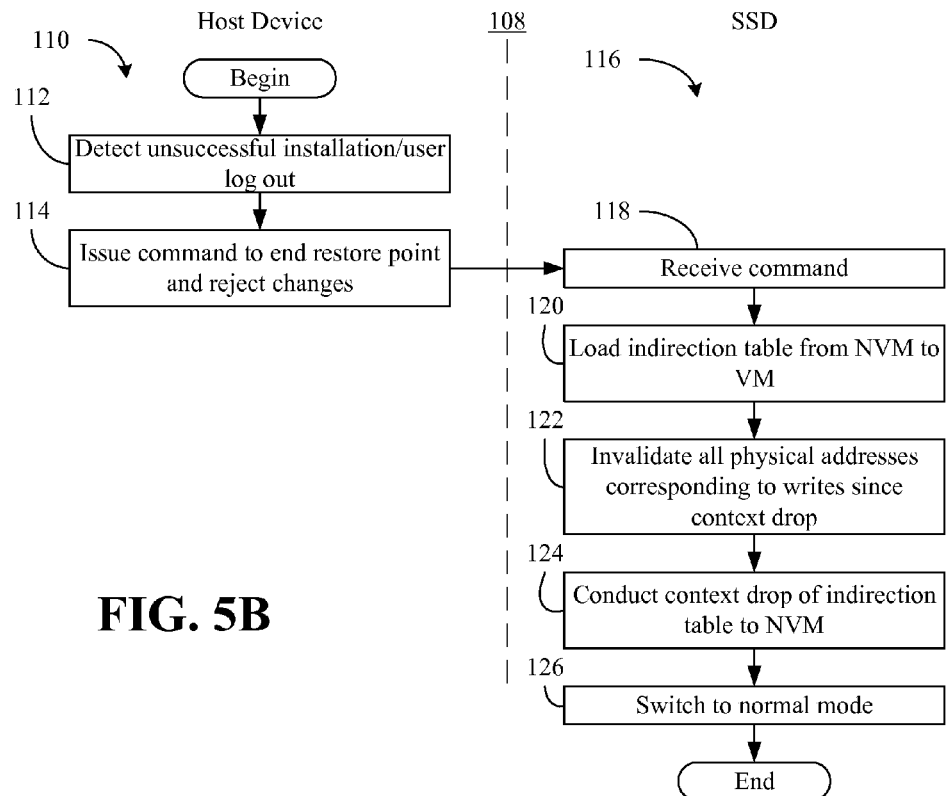

FIG. 5B shows a method 108 of ending a restore point and rejecting changes. In the illustrated example, a host device portion 110 of the method 108 involves detecting an event such as, for example, an unsuccessful upgrade/patch installation (e.g., due to a power loss, file corruption, etc.) or a user request to log out of an iCafe session at block 112. A command to end a restore point and reject changes can be issued at block 114 in response to the unsuccessful installation/log out request, wherein an SSD portion 116 of the method 108 may receive the command at block 118. Block 120 provides for loading an indirection table (e.g., previously stored via context drop) from NVM to VM, and block 122 provides for invalidating the physical addresses corresponding to writes occurring since the context drop that started the restore point. A context drop of the indirection table from VM to NVM may be conducted at block 124, wherein illustrated block 126 switches the SSD back to normal mode.

Figure 6:
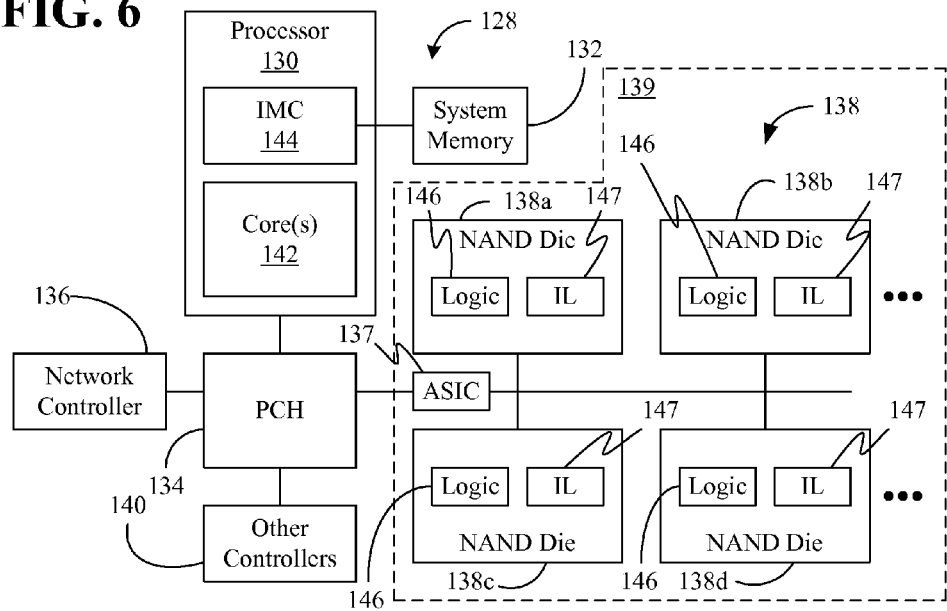
FIG. 6 is a block diagram of an example of a computing system according to an embodiment.

Turning now to FIG. 6, a computing system 128 is shown. The illustrated computing system 128 includes a processor 130, system memory 132, a platform controller hub (PCH) 134, a network controller 136, and an SSD board having a plurality of NAND memory devices such as NAND die/chips 138 (138a-138d) and various other controllers 140. The system 128 could be part of a mobile platform such as a laptop, personal digital assistant (PDA), wireless smart phone, mobile Internet device (MID), tablet, media player, imaging device, etc., or any combination thereof. The system 128 may also be part of a fixed platform such as a personal computer (PC), server, workstation, etc. Thus, the processor 130 may include one or more processor cores 142 and an integrated memory controller (IMC) 144 configured to communicate with the system memory 132. The system memory 132 could include, for example, dynamic random access memory (DRAM) configured as a memory module such as a dual inline memory module (DIMM), a small outline DIMM (SODIMM), etc.

The illustrated PCH 134, sometimes referred to as a Southbridge of a chipset, functions as a host device and communicates with the network controller 136, which could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The other controllers 140 could communicate with the PCH 134 to provide support for user interface devices such as a display, keypad, mouse, etc. in order to allow a user to interact with and perceive information from the system 128.

The NAND chips 138 might be used collectively as a solid state drive (SSD) or a cache memory in which high capacity data storage and/or a significant amount of parallelism may be desired. The NAND chips 138 could also be used as a USB (Universal Serial Bus, e.g., USB Specification 2.0, USB Implementers Forum) flash storage device. There may also be solutions that include NAND controllers implemented as separate application specific integrated circuit (ASIC) controllers 137 being connected to the PCH 134 on other standard buses such as a Serial ATA bus, or a PCI Express Graphics (PEG, e.g., Peripheral Components Interconnect/PCI Express x16 Graphics 150W-ATX Specification 1.0, PCI Special Interest Group) bus. Each NAND chip 138 may also be configured to communicate with the PCH 134 according to a protocol such as the Open NAND Flash Interface (e.g., ONFI Specification, Rev. 2.2, Oct. 7, 2009) protocol, or other suitable protocol.

In the illustrated example, each NAND chip 138 includes logic 146 to receive a command from the PCH 134 to start a restore point for the NAND die 138 and conduct a context drop of an indirection table from volatile memory to non-volatile memory in response to the command. In addition, the logic 146 may initialize and maintain an invalidate list ("IL") 147 to ensure that previous physical addresses corresponding to write operation logical addresses are invalidated only if a command to end the restore point and accept changes is received, as already discussed.

Generally, the NAND chips 138 may use floating-gate transistors that are connected in a way that resembles a NAND gate: several transistors are connected in series, and only if all word lines are pulled high (above the transistors' threshold voltage) is the bit pulled low. These groups may then be connected via some additional transistors to a NOR-style bit line array. To read, most of the word lines can be pulled up above the threshold voltage of a programmed bit, while one of them is pulled up to just over the threshold voltage of an erased bit. Thus, the series group may conduct (and pull the bit line low) if the selected bit has not been programmed. Other techniques and transistor configurations for implementing the NAND chips 138 may also be used.

The techniques described herein may therefore reduce the amount of time required for system updates and may provide more robust safety mechanisms. For example, an SSD can remember all writes, including any rogue writes to files not typically specified in a system restore point by the OS.

Embodiments of the present invention are applicable for use with all types of semiconductor integrated circuit ("IC") chips. Examples of these IC chips include but are not limited to processors, controllers, chipset components, programmable logic arrays (PLA), memorys chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a processor;
   a solid state drive including volatile memory, non-volatile memory, and logic configured to,
      receive a first command to start a restore point for the solid state drive, and
      create a restore point in the non-volatile memory in response to the first command; and
   a computer readable storage medium including a set of instructions which, when executed by the processor, cause the system to issue the first command to start a restore point to the solid state drive,
   wherein creation of the restore point includes a context drop of an indirection table from the volatile memory to the non-volatile memory and the logic is configured to,
      detect a write operation subsequent to the context drop,
      identify a logical address corresponding to the write operation,
      store data corresponding to the write operation to a physical address on the non-volatile memory,
      defer an invalidation of a previous physical address corresponding to the logical address, and
      invalidate the previous physical address only if a second command to end the restore point and accept changes is received, and
   wherein the instructions, when executed, cause the system to,
      detect a successful software installation, and
      issue the second command to the solid state drive in response to the successful software installation.

2. The system of claim 1, wherein the logic is configured to, store the logical address as an entry to an invalidate list, and update an active indirection table based on the write operation, wherein one or more pages in a page bitmask table that correspond to entries in the invalidate list are invalidated in response to the second command.

3. The system of claim 1, wherein the logic is configured to, use the logical address to look up the previous physical address in an active indirection table,
   store the logical address and the previous physical address as an entry to an invalidate list, and
   update the active indirection table based on the write operation, wherein one or more physical addresses that correspond to entries in the invalidate list are invalidated in response to the second command.

4. The system of claim 3, wherein the logic is configured to use the invalidate list to conduct a defragmentation of the solid state drive.

5. The system of claim 1,
   wherein creation of the restore point includes a context drop of an in-direction table from the volatile memory to the non-volatile memory and the logic is configured to,
      receive a second command to end the restore point and reject changes,
      load the indirection table from the non-volatile memory to the volatile memory in response to the second command, and
      invalidate a physical address corresponding to one or more write operations that have occurred since the context drop, and
   wherein the instructions, when executed, cause the system to,
      detect an event including at least one of an unsuccessful software installation and a user log out from the system, and
      issue the second command in response to the event.

6. The system of claim 1,
   wherein the logic is configured to,
      receive a third command to report a maximum number of write operations that can be handled after a restore point is started, and
      return a value in response to the third command based on a spare capacity of the solid state drive, and
   wherein the instructions, when executed, further cause the system to issue the third command to the solid state drive.

7. The system of claim 1, wherein the logic is configured to, determine that a power loss has occurred, and
   invalidate a physical address corresponding to one or more write operations that have occurred since the context drop in response to the power loss.

8. An apparatus comprising:
   logic configured to,
      receive a command to start a restore point for a solid state drive, and
      create a restore point in a non-volatile memory of the solid state drive in response to the command to start the restore point,
   wherein creation of the restore point includes a context drop of an indirection table from a volatile memory of the solid state drive to the non-volatile memory and the logic is configured to:
      detect a write operation subsequent to the context drop,
      identify a logical address corresponding to the write operation,
      store data corresponding to the write operation to a physical address on the non-volatile memory,
      defer an invalidation of a previous physical address corresponding to the logical address, and
      invalidate the previous physical address only if a command to end the restore point and accept changes is received.

9. The apparatus of claim 8, wherein the logic,
- stores the logical address as an entry to an invalidate list, and
- updates an active indirection table based on the write operation, wherein one or more pages in a page bitmask table that correspond to entries in the invalidate list are invalidated in response to the command to end the restore point and accept changes.

10. The apparatus of claim 8, wherein the logic is configured to,
- use the logical address to look up the previous physical address in an active indirection table,
- store the logical address and the previous physical address as an entry to an invalidate list, and
- update the active indirection table based on the write operation, wherein one or more physical addresses that correspond to entries in the invalidate list are invalidated in response to the command to end the restore point and accept changes.

11. The apparatus of claim 10, wherein the logic is configured to use the invalidate list to conduct a defragmentation of the solid state drive.

12. The apparatus of claim 8, wherein creation of the restore point includes a context drop of an indirection table from a volatile memory of the solid state drive to the non-volatile memory and the logic is configured to,
- receive a command to end the restore point and reject changes,
- load the indirection table from the non-volatile memory to the volatile memory in response to the command to end the restore point and reject changes, and
- invalidate a physical address corresponding to one or more write operations that have occurred since the context drop.

13. The apparatus of claim 8, wherein the logic is configured to,
- receive a command to report a maximum number of write operations that can be handled after a restore point is started, and
- return a value in response to the command to report the maximum number of write operations based on a spare capacity of the solid state drive.

14. The apparatus of claim 8, wherein the logic is configured to,
- determine that a power loss has occurred, and
- invalidate a physical address corresponding to one or more write operations that have occurred since the context drop in response to the power loss.

15. A computer readable storage medium comprising a set of instructions which, when executed by a processor, cause a computer to:
- issue a first command to a solid state drive, wherein the first command instructs the solid state drive to start a restore point;
- detect an event; and
- issue a second command to the solid state drive in response to the event, wherein the second command instructs the solid state drive to end the restore point,
- wherein the first command to start the restore point includes a context drop of an indirection table from a volatile memory of the solid state drive to the non-volatile memory and further cause the computer to:
  - detect a write operation subsequent to the context drop,
  - identify a logical address corresponding to the write operation,
  - store data corresponding to the write operation to a physical address on the non-volatile memory,
  - defer an invalidation of a previous physical address corresponding to the logical address, and
  - invalidate the previous physical address only if a command to end the restore point and accept changes is received.

16. The computer readable storage medium of claim 15, wherein the event includes at least one of an unsuccessful software installation and a user log out from the computer, and the second command instructs the solid state drive to reject changes.

17. The computer readable storage medium of claim 15, wherein the event includes a successful software installation and the second command instructs the solid state drive to accept changes.

18. The computer readable storage medium of claim 15, wherein the instructions, when executed, further cause a computer to issue a third command to the solid state drive, wherein the third command instructs the solid state drive to report a maximum number of write operations that can be handled after a restore point is started.

* * * * *